Nov. 20, 1923. 1,474,461
E. A. BIRCHER
FERMENTATION SEAL
Filed Dec. 29, 1922
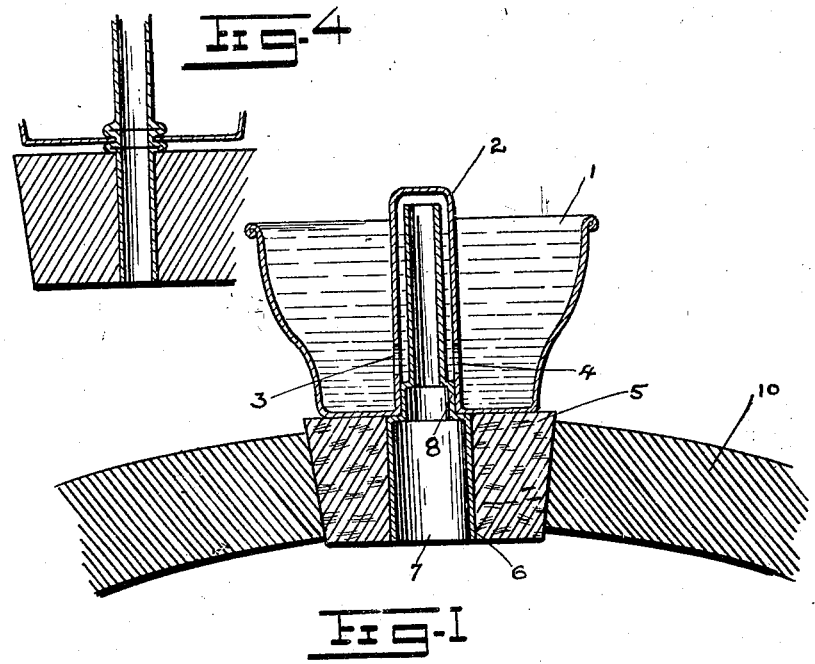
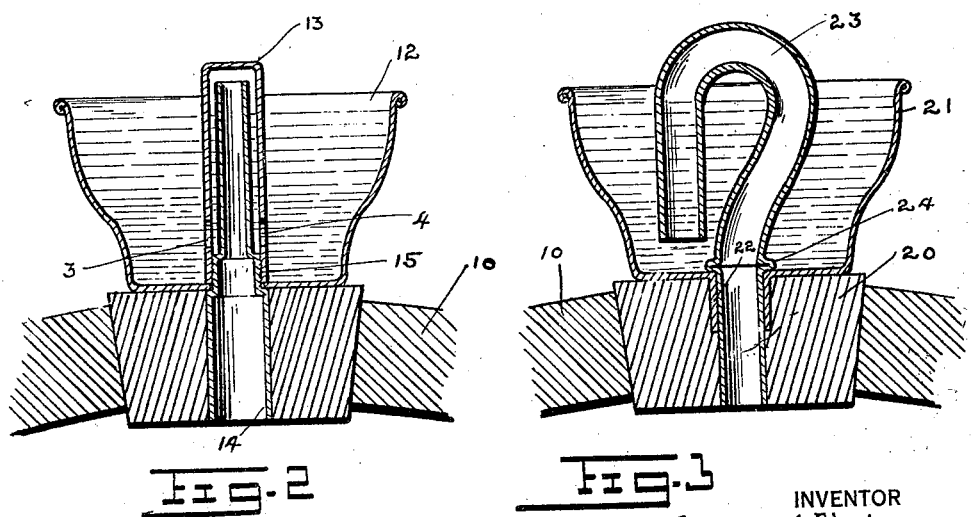
INVENTOR
Eugene A. Bircher
BY
Frank Keiper
ATTORNEY Patented Nov. 20, 1923.

1,474,461

UNITED STATES PATENT OFFICE.

EUGENE A. BIRCHER, OF ROCHESTER, NEW YORK.

FERMENTATION SEAL.

Application filed December 29, 1922. Serial No. 609,763.

*To all whom it may concern:*

Be it known that I, EUGENE A. BIRCHER, a citizen of the United States, residing at Rochester, in the county of Monroe and State of New York, have invented certain new and useful Improvements in Fermentation Seals, of which the following is a specification.

The object of this invention is to provide a new and improved fermentation seal.

This and other objects of the invention will be fully illustrated in the drawing, described in the specification and pointed out in the claims at the end thereof.

In the drawing:

Figure 1 is a vertical section of one form of the seal.

Figure 2 is a vertical section of a second form of the seal.

Figure 3 is a vertical section showing a third form of the seal.

Figure 4 is a vertical section showing the fourth form of the air tube.

In the drawings like reference numerals indicate like parts.

In the drawings, reference numeral 1 indicates the bowl of the seal which is formed of metal and is preferably pressed or drawn to the desired shape. Located centrally of this bowl is the upright air chamber 2 which in the type shown in Figure 1 is made preferably integral therewith. This air chamber is perforated near the bottom thereof as indicated at 3 and 4. This air chamber and bowl rest upon a plug or cork 5 which cork is perforated as indicated at 6 and has a tube 7 inserted therein making an air tight joint therewith. This tube 7 extends up to near the top of the air chamber and is made preferably by being drawn and is also made in one piece. This tube is provided with a shoulder as indicated at 8 which makes a pressed fit with the bottom of the air chamber so as to make an air tight joint therewith.

This fermentation seal is used as follows:

10 represents a cask or barrel which has an opening in the top thereof usually called a bunghole. In this cask the fermentation of fruit juices can be carried on and to carry on the fermentation properly it is necessary to exclude all air from the cask. For this purpose seals of various kinds have heretofore been used, mostly made of glass which seals are both cumbersome and fragile. This attachment is used by inserting the cork 5 in the bunghole to make an air tight joint therewith. The process of fermentation causes the generation of gas which passes up through the opening in the tube 7 and down through the air chamber 2 and out through the openings 3 and 4. In this way the gases caused by the fermentation are permitted to escape. To prevent the entrance of air the bowl 1 is filled with water to any depth desired above the vent openings 3 and 4 and when so filled it will prevent the entrance of air into the cask but will permit the escape of the gases of fermentation which will bubble out through the water from the openings 3 and 4.

In Figure 2 I have shown the bowl 12 made in one piece and the air chamber 13 made in a separate piece. In this case the tube 14 is threaded at the shoulder 15 with a male thread and the air chamber 13 is threaded at the bottom with a female thread so that the one is screwed fast to the other. The bowl 12 is provided with an opening in the bottom through which the reduced end of the tube 14 extends and on which the bottom of the air chamber rests and engages so that the bowl is clamped between the shoulder on the tube and the bottom of the air chamber. The air chamber is provided with the same vent openings 3 and 4 as are shown in Figure 1 and the operation of the device to prevent the entrance of air and permit the escape of gases is the same as that shown above in Figure 1.

In Figure 3 I have shown the cork 20 and the bowl 21 which has an opening in the bottom thereof and a thimble 22 drawn on the bottom thereof and extending downwardly into the cork with which it makes an air tight joint or pressed fit. 23 indicates the tube which is goose-necked and extends down through the cork which is provided with an annular shoulder 24 with which it rests on the bottom of the bowl. This tube makes a pressed fit with the thimble and with the cork so as to make an air tight joint therewith.

The bowl is filled with water to any depth above the downturned open end of the goose-neck tube which water makes a seal with the tube that permits the gases of fermentation to escape in bubbles through the water and prevents the air from entering the cask.

In Figure 4 a modified form of fastening the tube 23 to the bottom of the cup 21 is shown. In this form a collar is formed at the top and bottom of the bottom of the cup so that this bottom is tightly held between the collars and forms a water tight joint between the pipe and the bottom of the cup.

The upper end of the air tube may be furnished with a goose-neck as shown in Figure 3 or an air chamber may be used as shown in Figure 2 the bottom of the air chamber embracing the upper collar.

The collars are formed on the tube in a punch press and for this purpose a lower die is used having an opening therein which will receive the tube and prevent its expansion. A mandrel is pressed centrally in the opening of the die which mandrel extends a little above the top of the bottom die. This mandrel fills the opening in the tube so that the tube cannot collapse inwardly under the pressure of the press but can only expand outwardly.

The upper die also has a hole in it which makes close engagement with the tube and when the ram descends the tool first completely embraces the upper part of the tube except the part that is intended for the flange and as the stroke is completed the tube is expanded at the part exposed between the dies as shown in Figure 3.

The tube is then removed from the die and the long end of the tube in the form shown in Figure 3 is spun over into a goose-neck by a tool similar to a wire former. The goose-neck is then put into a split die which firmly embraces it with the shoulder resting on the top of the die. The bowl is then placed downward over the short end of the tube and the die with the bowl resting on the collar. Another die with a mandrel in it is then driven down over the tube causing the second collar to be formed as shown in Figure 4 firmly clamping the tube and bowl together with a tight joint.

It will be understood that the tube need not set down in the plug but a separate tube may be used in the plug to which the lower end of the tube of the seal may be connected in any suitable way as by a rubber tube.

I claim:

1. A fermentation seal comprising a bowl, a tube extending through the bottom of the bowl, said tube having a collar formed thereon above and below the bottom of the bowl by which the bowl and tube are fastened together by a tight joint, said tube having its upper end turned down into the bowl.

2. A fermentation seal comprising a bowl, a sleeve formed on the bottom of said bowl and extending perpendicular thereto to form a socket, a tube adapted to be supported in said socket and projecting upwardly into said bowl, said tube having its upper end turned down into said bowl and having its lower end projecting through said sleeve in the bottom of said bowl.

3. A fermentation seal comprising a bowl, a sleeve formed on the bottom of said bowl and extending perpendicular thereto to form a socket, a tube adapted to be supported in said socket and projecting upwardly into said bowl, said tube having its upper end turned down into said bowl and having its lower end projecting through said sleeve in the bottom of said bowl, the bend in said tube being located above the upper edge of said bowl.

4. A fermentation seal comprising a bowl, a sleeve formed on the bottom of said bowl and extending perpendicular thereto to form a socket, a tube adapted to be supported in said socket and projecting upwardly into said bowl, said tube having its upper end turned down into the said bowl and having its lower end projecting through said sleeve in the bottom of said bowl, the bend in said tube being located above the upper edge of said bowl, a shoulder formed on the outside of said tube adapted to support said tube in a predetermined position in said socket and said bowl.

5. A fermentation seal comprising a bowl, a socket formed in the bottom of said bowl and extending therethrough, a tube passing through said socket, a shoulder formed on said tube to support said tube in a predetermined position in said socket and said bowl, a plug surrounding the lower ends of said socket and said tube and forming a seat for the bottom of said bowl, the upper end of said tube being bent down into said bowl with the reverse bend located above said bowl.

In testimony whereof I affix my signature.

EUGENE A. BIRCHER.